United States Patent [19]

McNay et al.

[11] Patent Number: 5,854,298
[45] Date of Patent: Dec. 29, 1998

[54] PHOTOCURABLE LOW OBSERVABLE AIRCRAFT MATERIALS

[75] Inventors: Stephanie D. McNay, Acton, Calif.; Dustin B. Martin; Thomas L. Marino, both of Toledo, Ohio; Douglas C. Neckers, Perrysburg, Ohio

[73] Assignee: Lockheed Martin Corporation, Palmdale, Calif.

[21] Appl. No.: 936,221

[22] Filed: Sep. 29, 1997

[51] Int. Cl.$^6$ .............................. C08F 2/50; C08K 3/22; C08K 3/00; C08K 3/08
[52] U.S. Cl. .................... 522/25; 522/6; 522/26; 522/81; 522/83; 522/30; 522/2; 522/182
[58] Field of Search .............................. 522/2, 6, 25, 26, 522/81, 83, 30, 182

[56] References Cited

U.S. PATENT DOCUMENTS

| | | | |
|---|---|---|---|
| 3,968,056 | 7/1976 | Bolon et al. | 522/81 |
| 4,442,197 | 4/1984 | Crivello et al. | 430/280 |
| 5,306,739 | 4/1994 | Lucey | 522/42 |
| 5,395,862 | 3/1995 | Neckers et al. | 522/25 |
| 5,451,343 | 9/1995 | Neckers et al. | 522/25 |
| 5,639,802 | 6/1997 | Neckers et al. | 522/25 |
| 5,658,964 | 8/1997 | Amon et al. | 522/81 |

*Primary Examiner*—Susan W. Berman
*Attorney, Agent, or Firm*—Robert A. Schruhl

[57] ABSTRACT

The present invention relates to a hybrid cure mechanism developed to polymerize highly filled/loaded, optically opaque, acrylate polymeric material compositions by radiant energy. The hybrid cure mechanism, when incorporated into a resinous composition, can be utilized to repair surface coatings on high performance aircraft where an extended composition pot life or application life and rapid cure capability combined with an acceptable shelf life stability are required. More specifically, the present invention relates to an electrically conductive resinous paint or gap filler for a suitably prepared composite or metallic surface. The composition also has applications on a production line of high performance aircraft.

20 Claims, No Drawings

PHOTOCURABLE LOW OBSERVABLE AIRCRAFT MATERIALS

FIELD OF THE INVENTION

This invention relates to a method for curing a highly filled resin composition for use in military and commercial aircraft applications, satellite applications and weapon systems, including use in low observable aircraft applications to impart low observable performance characteristics.

BACKGROUND OF THE INVENTION

The present invention relates to a method for curing a highly filled resin composition for use in military and commercial aircraft applications employing a hybrid cure mechanism. This hybrid cure mechanism, when incorporated into a resinous composition, can be utilized to repair surface coatings on high performance aircraft where an extended composition pot life or application life and rapid cure capability combined with an acceptable shelf life stability are required. More specifically, the present invention relates to an electrically conductive resinous paint or gap filler for a suitably prepared composite or metallic surface. The composition also has applications on a production line of high performance aircraft.

Designing, developing, and building aircraft capable of attaining supersonic speeds at ever greater altitudes while maintaining profiles that are nearly invisible to electronic tracking means has become the mission statement of the aerospace industry worldwide. In order to attain the increasingly demanding parameters for aircraft performance, the known metallurgical sciences have been rewritten with the result being the development of lighter and stronger materials. Furthermore, as the metallurgical frontiers have been pushed back and many new products have been developed, it has become increasingly important that polymer chemistry, especially with regard to aerodynamically directed surface compositions, i.e., paints, coatings, and gap fillers having specific electrical and electromagnetic properties, follow suit.

As scientists have developed high performance aerodynamic materials, the application and maintenance of these materials has presented significant challenges to engineers and maintenance personnel alike. The new materials are challenging because many have a short application time or pot life making them both, difficult to apply and difficult to achieve an aerodynamically acceptable surface that is invisible to radar. In addition, complete cure of some materials is achieved only by exposing the material to an elevated temperature for a minimum of ten minutes or some materials may require exposure to ambient conditions for an extended period of time, usually 24 hours to as much as 14 days. Having to force cure or wait an extended period or time for cure at ambient conditions represents significant problems when high performance aircraft undergo routine maintenance procedures.

The aerospace industry has long been confronted with the problem of field repairs on aircraft, specifically the repair of coatings, without having to take the aircraft out of active use to accommodate the extended cure or force cure period for resin-based systems. Many approaches have been attempted to overcome these problems.

Polymer coatings which can be cured by exposure to ultraviolet (UV) or other radiation have achieved a high degree of practical utility since they offer many specific advantages. UV curing systems can be comprised of 100% reactive components, thereby avoiding the need for solvents and their safety and environmental hazards. Typical light curable materials utilize wavelengths (200–400 nm) to initiate cure. In the electromagnetic spectrum, the shorter the wavelength the higher the energy per photon. Ultraviolet light has higher energy than visible light wavelengths (400–700 nm) and is thus more efficient in activating photo initiators for polymerization. However, UV light lacks the possibility of depth of cure as most of the light is absorbed at the surface by the resin, the relatively high concentration of UV photo initiator (typically 5–10 wt. %), and any pigments that may be present. On the other hand visible light photo initiators are typically used at much lower concentrations (0.05–0.15 wt. %) and are photo-bleachable and become photochemically active and concurrently cease to absorb visible light. As a result more visible light continues to penetrate the coating and significantly enhances the depth of cure. Further, curing compositions can readily be tailored to more specific application requirements since available monomers and oligomers cover a wide range of properties.

Photocuring coating compositions are usually comprised of three components: the prepolymer, a photo initiator, and (optionally) additives. The prepolymer is a material or subunit capable of being polymerized into a polymer. In a preferred embodiment the prepolymer is a monomer. The monomer is an unsaturated or cyclic organic compound which can undergo polymerization. It can be a single compound or a mixture of compounds. Typical monomers employed in photocuring coating compositions include styrene-unsaturated polyesters, acrylates, thiol-enes, allyl ethers, vinyl ethers, epoxides, and the like. The monomers are preferably bi- or multi-functional, to form a highly cross-linked network providing maximum strength and stability. The photo initiators are photosensitive compounds which absorb radiation and produce activated species-typically free radicals (for styrenes, acrylate and allyl monomers) or cationic in nature (for vinyl ethers and epoxides)-to initiate polymerization or cross-linking. These photo initiators can be used as a single compound or a mixture of different compounds, to meet desired curing characteristics.

The additives include the usual pigments, dyes, inhibitors to prevent polymerization during storage, stabilizers to reserve optimum properties and prolong service life, regulators to adjust flow characteristics, and the like. Acrylic coatings, including those based on mono- and multi-functional acrylates, methacrylates, and acrylic oligomers derived from epoxides, polyesters, and polyurethanes combine the advantages of superior film properties (clarity, strength, adhesion, gloss, etc.); adjustable flow properties for easy application; and rapid curing. Unfortunately, the photo initiators that have been classically employed to initiate the polymerization of such coatings have several major drawbacks that severely limit their effectiveness when used with such compositions. First, and as previously stated, ultraviolet-based photo initiators lack the ability to effectuate depth of cure as most of the UV light/radiation is absorbed at the resin's surface. This inability to effect deep radiation curing of highly filled polymeric compositions means that the filler load capacity of any given polymeric material, i.e., monomer or oligomer, etc., is severely limited. This limitation in curing capacity for highly filled polymeric compositions means that limitations are placed upon electrical and electromagnetic properties that are imparted to the polymeric material when a selected filler is added to the polymeric material at a certain volume or weight % of the composition. In the case of many highly filled compositions conductivity is a major consideration in selecting a filler agent and in determining the weight % of said filler to be added to the polymeric material. This is especially the case when the coating is to be utilized in connection with specialized composite materials utilized in the manufacture of high performance aircraft and related high stress and high demand applications.

In U.S. Pat. No. 4,349,605, there are disclosed radiation curable polymeric compositions having flame retardant properties which contain copolymers of ethylene and a co-monomer which may be a vinyl ester or acrylate or a methacrylate, a hydrated inorganic filler, an alkoxy silane, and a lubricant comprising lauric acid and ethylene-bis-stearamide. Such polymeric compositions are disclosed to be preferably cured by radiation means, although cross-linking can also be achieved by chemical and thermal means. According to the patentees, such polymeric compositions will hold a very large amount of filler and still provide high flexibility and a high degree of cross-linking. However, in order to cure the composition claimed in this patent with very large amounts of filler, the preferred mode of the cure shifts from radiation curing to chemical or thermal curing.

Ultraviolet curing of coating compositions has been known now for sometime. Exemplary of the prior art are U.S. Pat. Nos. 3,896,014; 4,349,605; and 5,306,739. U.S. Pat. No. 3,896,014 discloses liquid nail lacquer compositions which comprise as the essential components a polyene, a polythiol, a photo curing rate accelerator, and, as disclosed by the patentee, a surfactant from a particular class. In addition, this patent would also encompass a low volume or weight % of filler that would yield the desired color shade.

U.S. Pat. No. 5,391,587 discloses the use of fluorinated photo initiators in curing applications of fluorinated monomers. The disclosed photo initiator system utilizes UV radiation to initiate cure of said monomers and as such lacks the ability of the present invention to effectuate the required depth of cure required by highly filled (conductive) compositions.

U.S. Pat. No. 5,550,171 discloses a polymeric sulfonium salt photoinitator which utilizes UV light to initiate cure of a selected adhesive composition or resin for use on CD drives or hard discs.

U.S. Pat. No. 4,400,541 to Lyer discloses bis-(diphenylsulfoniophenyl)-sulfide bis-chloride salts of discrete molecular weight which are used as a starting material for the manufacture of other salts which has the utility as a catalyst for curing ultraviolet activated coating compositions.

U.S. Pat. No. 5,047,568 to Angelo et al., teaches sulfonium salts having a discrete molecular weight which may be used as a photo initiator for various adhesives.

U.S. Pat. No. 4,173,476 to Smith et al., teaches salt complexes which may be used as photo initiators in epoxy compositions. The disclosed compounds are triarylsulfonium complex salts having a discrete molecular weight. Crivello et al., U.S. Pat No. 4,442,197 also teaches photo curable compositions. The disclosed compositions are described as dialylphenacyl sulfonium salts or sulfonium salts of a discrete molecular weight. These compounds are polymerizable into epoxy resins through the use of ultraviolet light at a wavelength greater than 300 nm.

Each of the above referred to patents discloses an ultra violet curable coating and/or composition that demonstrates various desirable properties. However, none of the prior art discloses or teaches a visible light hybrid curing mechanism that when incorporated into a resinous composition possesses the capabilities, traits and properties as disclosed in the present invention. In particular, the prior art does not demonstrate the depth of cure, rate of cure, shelf life stability, conductivity, and overall electromagnetic properties attained with the present invention.

The present invention discloses a hybrid mechanism developed to cure highly filled, optically opaque, acrylated polymeric compositions. In particular, the present invention details a composition composed of the hybrid cure mechanism package, a blend of multifunctional acrylated monomers, and at least 50% (by weight) silver flake to yield a conductivity of less than 1 ohm/square, a pot life of at least one to two hours, and a cure time for a coating thickness of 0.002 inches of between two to eight minutes or less. A coating thickness of 0.050 inches comprised from the aforementioned composition has been cured in ten minutes or less. In addition, the resulting resinous composition has a shelf life of at least two and a half months. These demanding properties are necessary to effect field repairs and maintenance of aerodynamic aircraft coatings that impart the electrical and electromagnetic properties necessary to achieve a low observable radar cross section (low observable performance characteristics).

Accordingly, it is an objective of this invention to provide a visible light hybrid cure mechanism that is capable of enhancing the rate of cure and the depth of cure while maintaining a generally accepted shelf life of a highly filled polymeric composition or coating.

It is another objective of the present invention to provide a unique hybrid visible light photocuring mechanism that includes a hybrid electron donor/electron acceptor system for effectuating an enhanced cure response for highly filled polymeric compositions, coatings, paints or gap fillers.

SUMMARY OF THE INVENTION

The present invention is based upon the discovery that a unique visible light hybrid cure composition comprised of the visible light primary photo initiator H-Nu 470, 5,7-diiodo-3-butoxy-6-fluorone, a product manufactured by The Spectra Group Limited, of Maumee, Ohio, in conjunction with at least one co-initiator, preferably a borate salt and an onium salt in a 1–7–10 millimolar ratio blend, can effectuate the cure of a resin system containing large amounts of filler(s) resulting in an enhanced cure response, especially with regard to the following critical parameters/properties: rate or speed of cure, depth of cure, and pot life, while maintaining an acceptable shelf life stability.

Therefore in another aspect, the invention provides a unique cure mechanism which involves a hybrid electron donor/electron acceptor system by which a primary photo initiator and at least one co-initiator work in a concerted manner to effectuate an enhanced cure response to resin systems containing large amounts of fillers, particularly acrylated monomers.

DETAILED DESCRIPTION OF PREFERRED EMBODIMENTS OF THE INVENTION

A Unique Hybrid Electron Donor/Electron Acceptor Mechanism for Effectuating an Enhanced Cure Response for Resin Systems Activation of visible light photo initiators generally results in formation of initiating radicals through an oxidation reduction reaction. This mechanism is well established and involves an electron donor co-initiator, in the case of the present invention this co-initiator is preferably a triphenyl butylborate salt.

Initiator+Light—Excited State

Ex. State+El. donor—Ex. State.+El. Donor.+

El. Donor+—H+radical.

Radical.+Acrylate—Polymer

Electron transfer from the donor to the excited initiator forms the dye radical anion while oxidizing triphenylbutyl borate. The latter immediately decomposes to triphenylborane and butyl radical, the latter initiating cure. In a preferred embodiment of the present invention, the hybrid electron donor/acceptor system consists of a primary fluorone dye photo initiator, 5,7-diiodo-3-butoxy-6-fluorone manufactured by Spectra Group Limited and preferably two co-initiators; a butylborate salt, butyryl choline triphenyl butylborate, manufactured by the Spectra Group Limited, and a sulfonium salt, triarylsulfonium hexafluorophosphate, manufactured by Union Carbide Corporation. When admixed into a resinous composition, preferably an acrylated composition, these molecules produce enhanced cure results when the initiator/resin composition incorporates a filler weight percent of at least 50% of said composition. The cure mechanism is such that upon absorption of a photon, the primary photoinitiator is promoted to its excited triplet state which is an electron acceptor in the current context. The details of this reactivity are reported in detail in the following publication: Hassoon, S.; Neckers, D. C. "Electron Transfer Photoreduction of 5,7-diiodo-3-Butoxy-6-Fluorone with Tetrabutylammonium Triphenylbutylborate and N,N-demethyl-2,6-diisopropylaniline", *J. Phys. Chem.*, 1995, 99, 9416. A copy of the mechanism reported in this paper is reproduced as Scheme 1.

After the primary photo initiator has accepted an electron from triphenylbutyl borate, the radical anion (primary photoinitiator product) is converted to ground state bleached reduction products by a variety of routes. One such route is the reaction of the radical anion with the partner triphenyl sulfonium salt wherein the sulfonium salt is reduced and the primary initiator radical is oxidized. Reduction of the sulfonium salt directly produces diphenyl sulfide and phenyl radical, the latter also being able to initiate radical chain processes and polymer formation from monomer. One route to the continuation of radical chain processes also involves other radical reactions of phenyl or butyl radicals with hydrocarbon residues present in the mixture. To the extent these reactions occur, and hydrocarbon radicals are produced, these in turn may be oxidized by sulfonium salt producing additional phenyl radicals and diphenyl sulfide. These reactions continue the radical reaction chain. Additionally, it should be noted that pigments present in the reaction mixture also contribute positively to an improved cure response though the mechanism is not entirely clear. However, it is important to point out that the presence of such pigments enhances the overall functioning of the hybrid cure process of the present invention, but as such are not to be considered necessary or vital to the use or functionality of the present invention.

The unique combination of the two co-initiators; a sulfonium salt and a borate salt, with the primary photo initiator results in a resinous composition that when large amounts of fillers are loaded or incorporated, yields an improved cure rate, depth of cure and pot life without sacrificing the long term shelf life stability. It is apparent that the unique electron donor/acceptor mechanism that results from the combination of the primary photo initiator, the borate salt and the onium salt, imparts into the resulting resin system unique processing capabilities not attainable utilizing other metal filled conventional curing systems.

Table I illustrates the processing advantages attained with a visible light hybrid cure based metal filled/loaded composition or coating over a metal filled/loaded conventional curing system such as C-400, a product of the Lockheed Martin Corporation, Skunk Works Division. The cure rate or time required to effectuate cure of the highly metal filled composition was significantly reduced utilizing the hybrid cure mechanism of the present invention. The ability to effectuate rapid cure of highly filled/loaded metallic compositions is vital in order for it to be utilized for field repair and maintenance applications on the skin surface coatings of high performance aircraft. Additionally, the ability to produce and store a one component coating or composition has substantial economic and application value over compositions or coating that comprise multiple components.

Therefore in accordance with one aspect of this invention, there is provided a visible light hybrid cure mechanism consisting of fluorone-based photo initiators which are comprised of a primary fluorone initiator, 5,7-diiodo-3-butoxy-6-fluorone, and at least one co-initiator selected from the group consisting of a borate salt or an onium salt. Wherein said borate salt is selected from the group consisting of butyryl choline triphenyl butylborate and tetramethylammonium triphenylbutyl borate, and wherein said onium salt is selected from a group consisting of triarylsulfonium hexafluorophosphate and triarylsulfonium hexafluoroantimonate.

The weight % blend or formulation of the above identified initiators comprising the visible light hybrid cure mechanism of the present invention is dependent upon the highly filled resin system that is to be cured and the function or purpose for which the highly filled resin system or coating is to be used. In a preferred embodiment of the invention the photo initiator comprises a 1–7–10 millimolar blend of the primary initiator, 5,7 -diiodo-3-butoxy-6-fluorone and a first co-initiator, butyryl choline triphenyl butylborate and a second co-initiator, triarylsulfonium hexafluorophosphate, said photo initiator composition comprising about 0.1 wt. % 5,7 diiodo-3-butoxy-6-fluorone, 0.5 wt. % butyryl choline triphenyl butylborate and 1.1 wt. % triarylsulfonium hexafluorophosphate of the highly filled resin (conductive) system or coating. In another aspect, this invention provides for a method for photopolymerizing unsaturated monomers, especially acrylated monomers, more particularly multifunctional monomers such as acrylated urethanes.

A primary application for the visible light hybrid cure mechanism of the present invention is its use in coatings applied to suitably selected composite or metallic substrates utilized in the design and manufacture of high performance aircraft, satellites and related applications. Additionally, the visible light hybrid cure mechanism of the present invention has application in a wide variety of military weapon systems where protective coatings are required and where the ability to perfect rapid field repairs is highly desirable. The present invention provides for visible light photoinitiators that have demonstrated properties that provide for an enhanced cure rate, depth of cure, pot life and stability of the final cured highly filled resin system, not attainable by traditional UV curing methods or procedures employing ambient cure. The following detailed description sets forth the preferred embodiments and the best mode presently contemplated for its practice.

The fluorone-based photoinitiators (hereinafter "photoinitiators") of the present invention are based upon the discovery that visible light can be utilized to effectuate cure of acrylated compositions in greater depth not attainable by use of conventional UV photo initiators or by heat curing procedures. This finding is described in U.S. Pat. No. 5,395,862 issued to Neckers et al. Visible light photoinitiators have advantages over UV photo initiators in highly filled or pigmented systems. Most fillers, including silver, i.e., Silflake 135, a product manufactured by Technic, Inc. of Cranston, R.I., both scatter and absorb UV incident light that is needed to induce UV cure. Thus, only visible light is transmitted which is highly dependent on the type and concentration of the filler and the intensity of the light source. In order to achieve a conductivity requirement of 1 ohm/square, the resin system must contain a high filler concentration; typically at least 80%. At this concentration, the resin/pigment blend restricts the quantity of light entering the mixture. However, as will be seen from the data, enough light penetrates to initiate a chemical reaction that generates a polymer film.

In a preferred embodiment of the present invention a photo initiator composition comprising a 1–7–10 millimolar ratio blend of a primary fluorone dye initiator, 5,7-diiodo-3-butoxy-6-fluorone, a first co-initiator, butyryl choline triphenyl butylborate and a second coinitiator, triarylsulfonium hexafluorophosphate is admixed with a highly filled resinous composition or coating, i.e., a filler wt. % of at least 50% of said composition, said filler preferably selected from the group consisting of silver and carbonyl iron and mixtures thereof. The primary initiator fluorone dye, 5,7 diiodo-3-butoxy-6 fluorone and the borate salt coinitiators butyryl choline triphenyl butylborate and tetramethylammonium triphenylbutyl borate are products manufactured by the Spectra Group Limited of Maumee, Ohio. The arylsulfonium salt co-initiators, triarylsulfonium hexafluorophosphate and triarylsulfonium hexafluoroantimonate are products produced by the Union Carbide Corporation. The highly filled/loaded resinous composition includes a monomer, preferably an acrylated urethane, more preferably a monomer selected from the group consisting of triethylene glycol diacrylate, tetraethylene glycol diacrylate, tripropylene glycol diacrylate, trimethylopropane triacrylate, dicyclopentenylacrylate and dimethylaminoethyl acrylate. The resulting photo initiator blend preferably comprises about 0.1 wt. % 5,7-diiodo-3-butoxy-6-fluorone, about 0.5 wt. % butyryl choline triphenyl butylborate and about 1~1 wt. % triarylsulfonium hexafluorophosphate into a resinous composition in which high filler loadings are incorporated.

Table II illustrates the cure time for multi functional acrylates utilizing the unique visible light hybrid composition of the present invention. Entries one and two illustrate the use of the primary initiator, 5,7-diiodo-3-butoxy-6-fluorone in conjunction with varying weights of the coinitiators, butyryl choline triphenyl butylborate and triarylsulfonium hexafluorophosphate. The cure time of the two formulations did not change, but entry one provided superior cured film properties.

Entries three and four of Table II substituted tetraethylammonium triphenylbutyl borate for the butyryl choline triphenyl butylborate of entries one and two. Although entries three and four provided the same cure results, the tetraethylammonium triphenylbutyl borate presented solubility challenges not presented by butyryl choline triphenyl butylborate.

Entries five through 11 illustrate additional iterations from the preferred embodiment of the present invention. Entries five through seven illustrate substituting an iodonium salt and alkyl aniline for the sulfonium and borate as well as well as common ultraviolet initiator packages. Although, the samples were still curable, the cure time was significantly increased, and it was felt that these formulations would be limited to a cure depth thickness of 0.002'. Entry eight was an attempt to decrease the cure time from entry one, but dark instability problems were encountered in 48 hours. Additionally, dark instability problems were encountered with entries nine and ten when pairing the iodonium salt with the butyryl choline triphenyl butylborate of the preferred embodiment. Entry 11 was a control sample to illustrate that the mixture does not cure without a photo initiator package.

Table III represents the experiments performed by substituting various initiator packages into 1,6-hexanediol diacrylate, a common oligomer. Entries one and two vary the primary visible light initiator with co-initiators comprising an alkyloxyaryl iodonium salt and an alkyl aniline. In both cases, cure of a 0.002" section was achieved in three minutes; however, entry three is the preferred embodiment of the present invention and achieved cure of a 0.002" section in two minutes. The remaining entries in Table III represent other commercial and proprietary ultraviolet initiator packages that did not fully cure after five minutes.

Table IV illustrates two variations of a visible light initiator package in an acrylated urethane with a hydroxyl functionality. Once again, the preferred embodiment of the present invention; sulfonium and borate co-initiators with the fluorone dye provided a cure time significantly faster than the fluorone dye in combination with the iodonium and alkyl aniline. Also, the sulfonium borate package will provide for cure depths greater than 0.002".

Table V portrays the overall shelf life stability achieved with the hexanediol diacrylate, multifunctional acrylate and hydroxyacrylated urethane oligomers incorporating the visible light hybrid cure mechanism in combination with at least 50% by weight silver flake. Most ambient or heat cured urethanes containing a metal filler have a shelf life of six months. The objective of the present invention is to match the six month shelf life of C-400 referenced in Table I. Entries in Table V have demonstrated that the preferred embodiment of the present invention have a shelf life of at least two and one-half months. Additionally, the pot life or working life studies performed indicated that the present the preferred photo initiator of the present invention was at least one hour (not shown).

In the preferred embodiment of the present invention, the filler is a metallic conductive flake composed of silver. However, it is understood that this is merely illustrative and not limitative of the fillers that can be utilized with the invention. Other fillers such as metal flakes and powders, metal coated glass beads, metal coated glass flakes, metal coated mica, glass beads or spheres, ceramics, inherently conducting polymers, corrosion inhibiting pigments and mixtures thereof are examples of fillers that are within the contemplation of the present invention. Indeed, it is within the contemplation of the present invention that any filler may be utilized that will meet the herein described parameters of the present invention.

In yet another preferred embodiment of the invention the resin system or resinous material is selected from a group consisting of pentaerythritol triacrylate, trimethylolpropane triacrylate, 1,6 hexanediol diacrylate, tetraethylene glycol diacrylate, tripropylene glycol diacrylate, triethylene glycol diacrylate and trimethylolpropane trimethacrylate. However, it is understood that these are merely illustrative and not limitative of the resin systems that are within the contemplation of the present invention. There are many mono- or multi functional monomers, particularly acrylates and alkacrylates such as cyclohexyl acrylate, ethyl acrylate, butyl acrylate, 2-ethylhexyl acrylate, 2-hydroxyethyl acrylate, hydroxypropyl acrylate, N-vinyl-2-pyrrollidone, 2-ethoxy ethoxyethyl acrylate, isobornyl acrylate, methyl acrylate, dimethylaminoethyl acrylate, diethylaminoethyl acrylate, tetrahydrofurfuryl acrylate, n-hexyl acrylate, n-lauryl acrylate, 2-phenoxyethyl acrylate, furfuryl-2-acrylate, 3-dimethylamino neopentyl acrylate, 2-cyanoethyl acrylate, benzyl acrylate, 2-N-morpholinoethyl acrylate, 2-tert-butyl aminoethyl acrylate, N-benzyl methacrylamide, bismethacrylopyethyl phosphate, 3-phenoxy-2-hydroxypropyl acrylate. 3-methacryloxpropyltris silane, ethylene glycol diacrylate polyethylene glycol diacrylate. 1,3 butylene glycol diacrylate, 1 4 butanediol diacrylate, di-ethylene glycol diacrylate, allyl acrylate, dianol diacrylate, monomethoxy glycerol propoxylate diacrylate trimethylol-propane triacrylate. dicyclopentenyl acrylate, pentaerythri-tol tetraacrylate, 1,6 hexanediol diglycidyl ether diacrylate, trimethylolpropane ethoxylate triacrylate, polyether triacrylate, ethoxylated bisphenol A diacrylate, neopentyl glycol diacrylate, thiodiglycol diacrylate and acrylated urethanes that are within the contemplation of the present invention.

In addition to the aforesaid essential ingredients, other components can be included within the resin curing process, as desired, and as long as they do not interfere with the curing process. Thus, for example, it may be desirable for a particular application, to include in the composition one or more of the following components: a wetting agent, a plasticizer, a leveling agent, a thixotropic agent, a flame retardant, an adhesion promoter, a stabilizer, or an inhibitor, all of which are commonly used in formulations of coating compositions, to afford certain physical properties thereto.

EXAMPLE 1

Method for photocuring a highly filled/loaded resinous composition utilizing the visible light hybrid curing mechanism of the present invention.

A photoinitiator composition is prepared by stirring a primary photo initiator. 5,7-diodo-3-butoxy-6-fluorone, and a first co-initiator, triarylsulfonium hexafluorophosphate and a second co-initiator, butyryl choline triphenyl butylborate into a resin system in a 1–7–10 millimolar ratio blend. However, other methods could be used, i.e., sonication or mechanical mixing. The resin-photo initiator mixture is heated at approximately 60 degrees for 15 minutes to an hour. Solubility of the mixture is checked periodically by placing a sample of the mixture between glass slides and illuminated with a high intensity light.

Metallic fillers are added to the resin-photo initiator mixture at a wt. volume or % of at least 50% of the resulting highly filled resinous composition, said resulting highly filled resinous composition having a conductivity of less than 1 ohm/square. The filler is selected from the group consisting of silver and iron and mixtures thereof. The mixture is exposed to radiant visible light sufficient to effect cure, i.e., (400–700 nm), preferably 470 nm for approximately 2 to 8 minutes to effectuate cure of said highly filled resin system.

EXAMPLE 2

A method for utilizing a highly loaded metallic filled resin system, such as a highly loaded metallic filled acrylated urethane composition, visible light curable.

The compositions of this example are particularly suitable for use in repair and maintenance applications of surface coatings of high performance aircraft. The compositions are applied in the following manner: a) the damaged surface area of the aircraft is cleaned and the damaged primer coating and residue of other protective coatings are removed. b) a new primer coating is laid down and allowed to set up or photocure, c) a stack up coating is prepared by blending a photo initiator composition consisting of a 1–7–10 millimolar ratio of a primary photo initiator. 5,7 diiodo-3 -butoxy-6-fluorone, a first co-initiator triaryl sulfonium hexafluorophosphate and a second co-initiator butyryl choline triphenyl butylborate into a selected resin system and heating the resulting mixture at 60 degrees for 15 minutes to an hour. checking solubility frequently by slide illumination procedures, adding sufficient metallic filler to the resin-photo initiator mixture to achieve a highly filled resin system with a conductivity of less than 1 ohm/square, i.e., a filler concentration of at least 50% of the resulting highly filled resin system and laying down a coating of the highly filled resin system onto the primer coating area of the aircraft surface, and d) exposing the stack up coating to ambient radiant visible light for from 2 to 8 minutes to achieve cure of the stack up coating.

The photocuring of such compositions is utilized to enhance the reliability, maintainability, and supportability of such resin systems, wherein such systems are used in low observable aircraft applications to impart low observable performance characteristics.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

TABLE I

Processing Advantages

| Characteristic | Visible Light Hybrid Cure Metal Filled Coating | Conventional Cure Metal Filled Coating |
|---|---|---|
| Cure Time/Schedule | 2 mins @ 25° C. | Seven Days @ 25° C. |
| Mixing Requirements | One Component | Two Component |
| Shelf Life | Six Months | Six Months |

Table II

Multifunctional Acrylate Blend

| Entry | Concentration of Initiator | Cure Time (Aerobic)/Thickness |
|---|---|---|
| 1 | 0.1% Fluorone Dye, 2.2% Triarylsulfonium Salt, 1.0% Triarylalkyl Borate Salt | 2 minutes/0.002" |
| 2 | 0.1% Fluorone Dye, 1.1% Triarylsulfonium Salt, 0.5% Triarylalkyl Borate Salt | 2 minutes/0.002" |
| 3 | 0.1% Fluorone Dye, 1.1% Triarylsulfonium Salt, 0.5% Triarylalkyl Borate Ammonium Salt | 2 minutes/0.002" |
| 4 | 0.1% Fluorone Dye, 1.1% Triarylsulfonium Salt, 0.5% Triarylalkyl Borate Ammonium Salt | 2 minutes/0.002" |
| 5 | 0.1% Fluorone Dye, 0.28% Diaryliodonium Salt, 0.4% N-substituted alkyl aniline | 5 minutes/0.002" |
| 6 | 5% Acylphosphine Oxide | 5 minutes/0.002" |
| 7 | 5% 3:1 ratio alpha-Amino-Ketones/Thioxanthone | 5 minutes/0.002" |
| 8 | 0.2% Fluorone Dye, 1.1% Triarylsulfonium Salt, 0.5% Triarylalkyl Borate Salt | Dark Instability in <48 hours |

Table II-continued

Multifunctional Acrylate Blend

| Entry | Concentration of Initiator | Cure Time (Aerobic)/Thickness |
|---|---|---|
| 9 | 0.1% Fluorone Dye, 2.2% Diaryliodonium Salt, 1.0% Triarylalkyl Borate Salt | Dark Instability in <24 hours |
| 10 | 0.1% Fluorone Dye, 1.1% Diaryliodonium Salt, 0.5% Triarylalkyl Borate Salt | Dark Instability <24 hours |
| 11 | No Initiator Package | Does not cure |

TABLE III

Hexanediol Diacrylate

| Entry | Concentration of Initiator | Cure Time (Anaerobic)/Thickness |
|---|---|---|
| 1 | 0.05% Flourone Dye, 0.12% Alkyloxyaryl Iodonium Salt, 0.2% N-substituted alkyl aniline | 3 minutes/0.002" |
| 2 | 0.1% Flourone Dye, 0.12% Alkyloxyaryl Iodonium Salt, 0.2% N-substituted alkyl aniline | 3 minutes/0.002" |
| 3 | 0.1% Flourone Dye, 1.1% Triarylsulfonium Salt, 0.5% Triarylalkyl Borate Salt | 2 minutes/0.002" |
| 4 | 2% Acylphosphine Oxide | Does not fully cure in 5 minutes |
| 5 | 5% Acylphosphine Oxide | Does not fully cure in 5 minutes |
| 6 | 0.5% Thioxanthone, 1.5% alpha-Amino-Ketone | Does not fully cure in 5 minutes |
| 7 | 1.25% Thioxanthone, 3.75% alpha-Amino-Ketone | Does not fully cure in 5 minutes |
| 8 | Proprietary ultraviolet initiator package | Does not fully cure in 5 minutes |

TABLE IV

Hydroxyacrylated Urethane

| Entry | Concentration of Initiator | Cure Time (Aerobic)/Thickness |
|---|---|---|
| 1 | 0.1% Fluorone Dye, 1.1% Triarylsulfonium Salt, 0.5% Triarylalkyl Borate Salt | 4 minutes/0.002" |
| 2 | 0.1% Fluorone Dye, 0.28% Diaryliodonium Salt, 0.4% N-substituted alkyl aniline | 8 minutes/0.002" |

TABLE V

Shelf Life Stability

| Entry | Concentration of Initiator | Resin System | Shelf Life |
|---|---|---|---|
| 1 | 0.1% Fluorone Dye, 1.1% Triarylsulfonium Salt, 0.5% Triarylalkyl Borate Salt | Hexanediol Diacrylate | >8 months |
| 2 | 0.1% Fluorone Dye, 1.1% Triarylsulfonium Salt, 0.5% Triarylalkyl Borate Salt | Multifunctional Acrylate | >4.5 months |
| 3 | 0.1% Fluorone Dye, 2.2% Triarylsulfonium Salt; 1% Triarylalkyl Borate Salt | Multifunctional Acrylate | >2.5 months |
| 4 | 0.1% Fluorone Dye, 1.1% Triarylsulfonium Salt, 0.5% Triarylalkyl Borate Salt | Hydroxyacrylated Urethane | >4 months |

SCHEME 1:
Mechanism of H-NU 470/Borate Proposed by S. Hassoon et al.

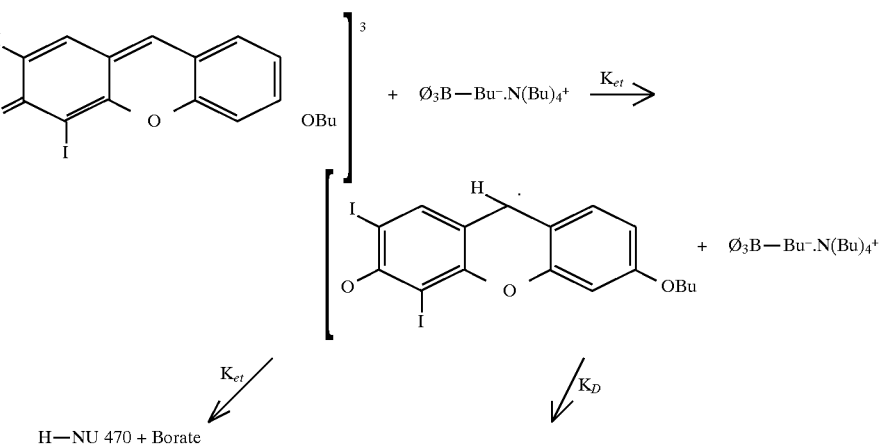

-continued
SCHEME 1:
Mechanism of H-NU 470/Borate Proposed by S. Hassoon et al.

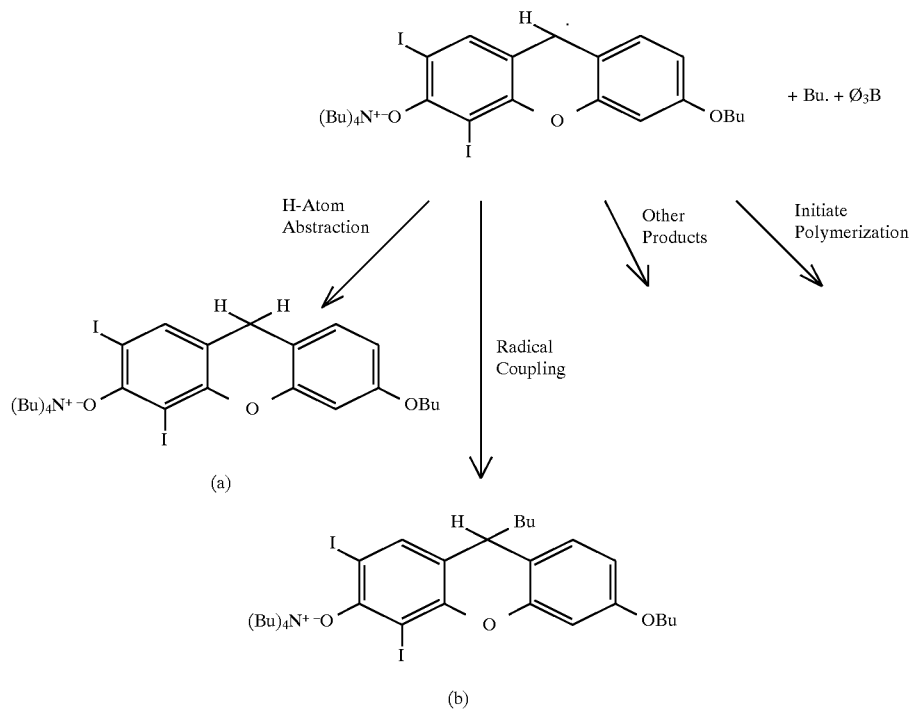

What is claimed:

1. A method for curing a highly filled resin composition for use in military and commercial aircraft applications, satellite applications and weapon systems, to impart low observable performance characteristics, which comprises the steps of 1) incorporating a photo initiator composition comprised of a fluorone dye primary photo initiator and at least one co-initiator into a given resin system, wherein said fluorone dye is 5,7-diiodo-3-butoxy-6-fluorone and said co-initiator is selected from the group consisting of a borate salt and an onium salt, resulting in the formation of a photo initiator-resin mixture, 2) adding a filler to said mixture so that the filler is at least 50 wt. % of a resulting photoinitiator-resin-filler composition and 3) exposing the photo initiator-resin-filler composition to a light source for from 2 to 8 minutes to effectuate cure of said photo initiator-resin-filler composition, wherein upon the irradiation of said photo initiator-resin-filler composition a unique electron donor/electron acceptor mechanism is activated within said photo initiator-resin-filler composition resulting in the initiation of polymerization of the resin system.

2. The method of claim 1 wherein said borate salt is selected from the group consisting of butyryl choline triphenyl butylborate and tetramethylammonium triphenylbutyl borate.

3. The method of claim 1 wherein said onium salt is selected from the group consisting of triarylsulfonium hexafluorophosphate and triarylsulfonium hexafluoroantimonate.

4. The method of claim 1 wherein said photo initiator composition comprises a 1–7–10 millimolar ratio blend of said primary initiator and first and second co-initiators.

5. The method of claim 4 wherein said primary initiator is 5,7-diiodo-3-butoxy-6-fluorone and said first co-initiator is butyryl choline triphenyl butylborate and said second co-initiator is triarylsulfonium hexafluorophosphate.

6. The method of claim 5 wherein said photo initiator composition comprises a weight % of said highly filled resin composition of about 0.1 % 5.7-diiodo-3-butoxy-6-fluorone, about 0.5 % butyryl choline triphenyl butylborate and about 1.1 % triarylsulfonium hexafluorophosphate.

7. The method of claim 1 wherein said highly filled resin composition includes a prepolymer.

8. The method of claim 7 wherein said prepolymer is a monomer.

9. The method of claim 8 wherein said monomer is selected from the group consisting of 1,6 hexanediol diacrylate, triethylene glycol diacrylate, tetraethylene glycol diacrylate, triproplylene glycol diacrylate, hydroxypropyl acrylate, pentaerythritol triacrylate, trimethylolpropane triacrylate, dicyclopentenylacrylate and dimethylaminoethyl acrylate.

10. The method of claim 1 wherein said highly filled resin composition includes a multi-functional acrylated urethane monomer.

11. The method of claim 1 wherein said highly filled resin composition includes at least one filler.

12. The method of claim 11 wherein said filler is selected from the group consisting of silver or carbonyl iron and mixtures thereof.

13. The method of claim 11 wherein said filler is selected from the group consisting of metal flakes, metal powders, metal coated glass beads, metal coated glass flakes, metal coated mica, glass beads and spheres, ceramics, inherently conductive polymers and mixtures thereof.

14. A method for making a highly filled optically opaque coating composition for use in military and commercial aircraft applications, satellite applications and weapon systems, including use in low observable aircraft applications to impart low observable performance characteristics, comprising the steps of:

a) blending into a resin system a visible light photo initiator composition comprising a primary photo initiator and at least one co-initiator to yield a photo initiator-resin mixture;

b) heating said photo initiator-resin mixture for a sufficient time to achieve a desired solubility of said mixture;

c) adding sufficient filler to said mixture to achieve a highly filled coating composition wherein said filer comprises at least 50 weight % of said coating composition and wherein said coating has a conductivity of less than 1 ohm/square, d) exposing the highly filled coating composition to a visible light source for from between 2 to 8 minutes to effectuate cure of said resin system.

15. The method of claim 14 wherein the photo initiator composition comprises a 1-7-10 millimolar ratio blend of a primary photo initiator and first and second co-initiators.

16. The method of claim 15 wherein said primary photo initiator is a fluorone dye, 5,7-diiodo-3-butoxy-6-fluorone, said first co-initiator is a borate salt, butyryl choline triphenyl butylborate and said second co-initiator is an onium salt, triarylsulfonium hexafluorophosphate.

17. The method of claim 16 wherein said resin system is selected from a group consisting of pentaerythritol triacrylate, trimethylolpropane triacrylate, 1,6-hexanediol diacrylate, tetraethylene glycol diacrylate, tripropylene glycol diacrylate and triethylene glycol diacrylate.

18. The method of claim 14 wherein said resin system is a multi functional acrylated urethane monomer.

19. The method of claim 14 wherein said filler is selected from the group consisting of silver or carbonyl iron and mixtures thereof.

20. The method of claim 14 wherein said filler is selected from a group consisting of metal flakes, metal powders, metal coated glass beads, metal coated glass flakes, metal coated mica, glass beads and spheres, ceramics, inherently conductive polymers and mixtures thereof.

* * * * *